(12) United States Patent
Moser et al.

(10) Patent No.: US 9,230,605 B1
(45) Date of Patent: Jan. 5, 2016

(54) DATA STORAGE DEVICE MAXIMIZING AREAL DENSITY BASED ON A TARGET QUALITY METRIC

(71) Applicant: Western Digital Technologies, Inc., Irvine, CA (US)

(72) Inventors: Andreas Moser, San Jose, CA (US); Thien Nguyen, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/556,645

(22) Filed: Dec. 1, 2014

(51) Int. Cl.
*G11B 7/00* (2006.01)
*G11B 27/36* (2006.01)
*G11B 5/09* (2006.01)

(52) U.S. Cl.
CPC . *G11B 27/36* (2013.01); *G11B 5/09* (2013.01)

(58) Field of Classification Search
CPC .... G11B 7/126; G11B 7/1267; G11B 7/0045; G11B 20/1403; G11B 27/24; G11B 7/131
USPC .................. 369/120, 121, 47.27, 47.5, 47.51, 369/47.52, 47.53, 116; 360/31, 68
See application file for complete search history.

(56) References Cited

U.S. PATENT DOCUMENTS

| | | | |
|---|---|---|---|
| 4,945,427 A | 7/1990 | Cunningham | |
| 5,596,458 A | 1/1997 | Emo et al. | |
| 5,739,994 A | 4/1998 | Ottesen et al. | |
| 5,812,755 A | 9/1998 | Kool et al. | |
| 5,870,237 A | 2/1999 | Emo et al. | |
| 5,930,069 A | 7/1999 | Kim | |
| 5,940,237 A | 8/1999 | Takagi | |
| 5,949,603 A | 9/1999 | Brown et al. | |
| 5,956,196 A | 9/1999 | Hull et al. | |
| 6,005,725 A | 12/1999 | Emo et al. | |
| 6,018,789 A | 1/2000 | Sokolov et al. | |
| 6,052,250 A | 4/2000 | Golowka et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,084,738 A | 7/2000 | Duffy | |
| 6,091,559 A | 7/2000 | Emo et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,118,604 A | 9/2000 | Duffy | |
| 6,130,796 A | 10/2000 | Wiselogel | |
| 6,137,644 A | 10/2000 | Hetzler et al. | |
| 6,145,052 A | 11/2000 | Howe et al. | |
| 6,172,839 B1 | 1/2001 | Ahn | |
| 6,175,893 B1 | 1/2001 | D'Souza et al. | |
| 6,178,056 B1 | 1/2001 | Cloke et al. | |
| 6,182,250 B1 | 1/2001 | Ng et al. | |
| 6,191,909 B1 | 2/2001 | Cloke et al. | |
| 6,195,218 B1 | 2/2001 | Guttmann et al. | |
| 6,205,494 B1 | 3/2001 | Williams | |

(Continued)

*Primary Examiner* — Nabil Hindi

(57) ABSTRACT

A data storage device is disclosed comprising a head actuated over a disk. Data is written to the disk and read from the disk to measure a quality metric. A recording parameter is repeatedly adjusted and the quality metric is measured for each adjustment of the recording parameter. An operating value for the recording parameter is selected that corresponds to a substantially maximum areal density for the disk when the measured quality metric substantially matches a target quality metric.

20 Claims, 5 Drawing Sheets

(56) References Cited

U.S. PATENT DOCUMENTS

| | | | |
|---|---|---|---|
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,160 B1 | 7/2001 | Liikanen et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,285 B1 | 11/2001 | Bi et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,396,654 B2 | 5/2002 | Jeong et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,466,387 B1 | 10/2002 | Ogasawara et al. |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,493,176 B1 | 12/2002 | Deng et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,560,052 B2 | 5/2003 | Ng et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,036 B2 | 6/2004 | Quak et al. |
| 6,751,402 B1 | 6/2004 | Elliott et al. |
| 6,757,481 B1 | 6/2004 | Nazarian et al. |
| 6,765,737 B1 | 7/2004 | Lim et al. |
| 6,765,744 B2 | 7/2004 | Gomez et al. |
| 6,772,281 B2 | 8/2004 | Hamlin |
| 6,778,343 B2 | 8/2004 | Nunnelley |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,972 B1 | 9/2005 | Chue et al. |
| 6,943,978 B1 | 9/2005 | Lee |
| 6,948,165 B1 | 9/2005 | Luu et al. |
| 6,950,256 B2 | 9/2005 | Kadokawa |
| 6,950,267 B1 | 9/2005 | Liu et al. |
| 6,954,733 B1 | 10/2005 | Ellis et al. |
| 6,956,710 B2 | 10/2005 | Yun et al. |
| 6,957,379 B1 * | 10/2005 | Patapoutian et al. ......... 714/774 |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |

(56) References Cited

U.S. PATENT DOCUMENTS

| | | |
|---|---|---|
| 6,969,989 B1 | 11/2005 | Mei |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,012,771 B1 * | 3/2006 | Asgari et al. .............. 360/31 |
| 7,012,773 B2 | 3/2006 | Ashikaga et al. |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,471 B2 | 5/2006 | Meyer et al. |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,102,838 B2 | 9/2006 | Kim et al. |
| 7,106,537 B1 | 9/2006 | Bennett |
| 7,106,947 B2 | 9/2006 | Boyle et al. |
| 7,110,197 B2 | 9/2006 | Cho |
| 7,110,202 B1 | 9/2006 | Vasquez |
| 7,111,116 B1 | 9/2006 | Boyle et al. |
| 7,113,358 B2 | 9/2006 | Zayas et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,145,740 B2 | 12/2006 | Zayas et al. |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,170,700 B1 | 1/2007 | Lin et al. |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,514 B1 | 5/2007 | Yang et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,283,316 B2 | 10/2007 | Chiao et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,362,529 B2 | 4/2008 | Chiao et al. |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,433,143 B1 | 10/2008 | Ying et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 * | 4/2011 | Jung et al. .............. 360/68 |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |

(56) References Cited

U.S. PATENT DOCUMENTS

| | | |
|---|---|---|
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2002/0039246 A1 | 4/2002 | Ding et al. |

(56) References Cited

U.S. PATENT DOCUMENTS

| | | |
|---|---|---|
| 2004/0136104 A1 | 7/2004 | Chiao et al. |
| 2004/0179292 A1 | 9/2004 | Zayas et al. |
| 2006/0018051 A9 | 1/2006 | Chiao et al. |
| 2006/0227445 A1 | 10/2006 | Chiao et al. |
| 2007/0064325 A1 | 3/2007 | Bi et al. |
| 2007/0127150 A1 | 6/2007 | Cho et al. |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

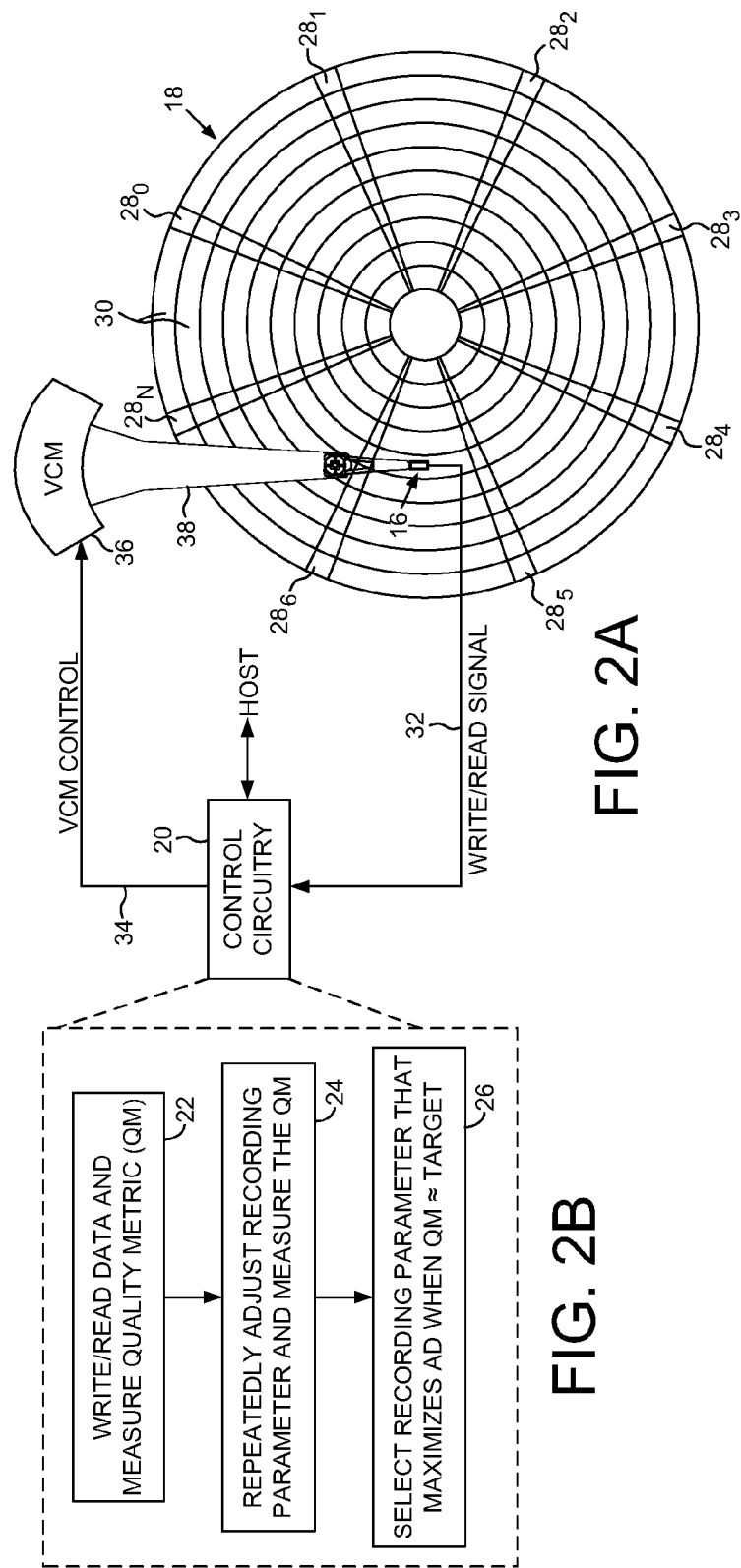

DATA STORAGE DEVICE MAXIMIZING AREAL DENSITY BASED ON A TARGET QUALITY METRIC

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a data storage device in the form of a disk drive according to an embodiment comprising a head actuated over a disk.

FIG. 2B is a flow diagram according to an embodiment wherein an operating value for a recording parameter is selected that corresponds to a substantially maximum areal density for the disk when a measured quality metric substantially matches a target quality metric.

DETAILED DESCRIPTION

Figure 1:
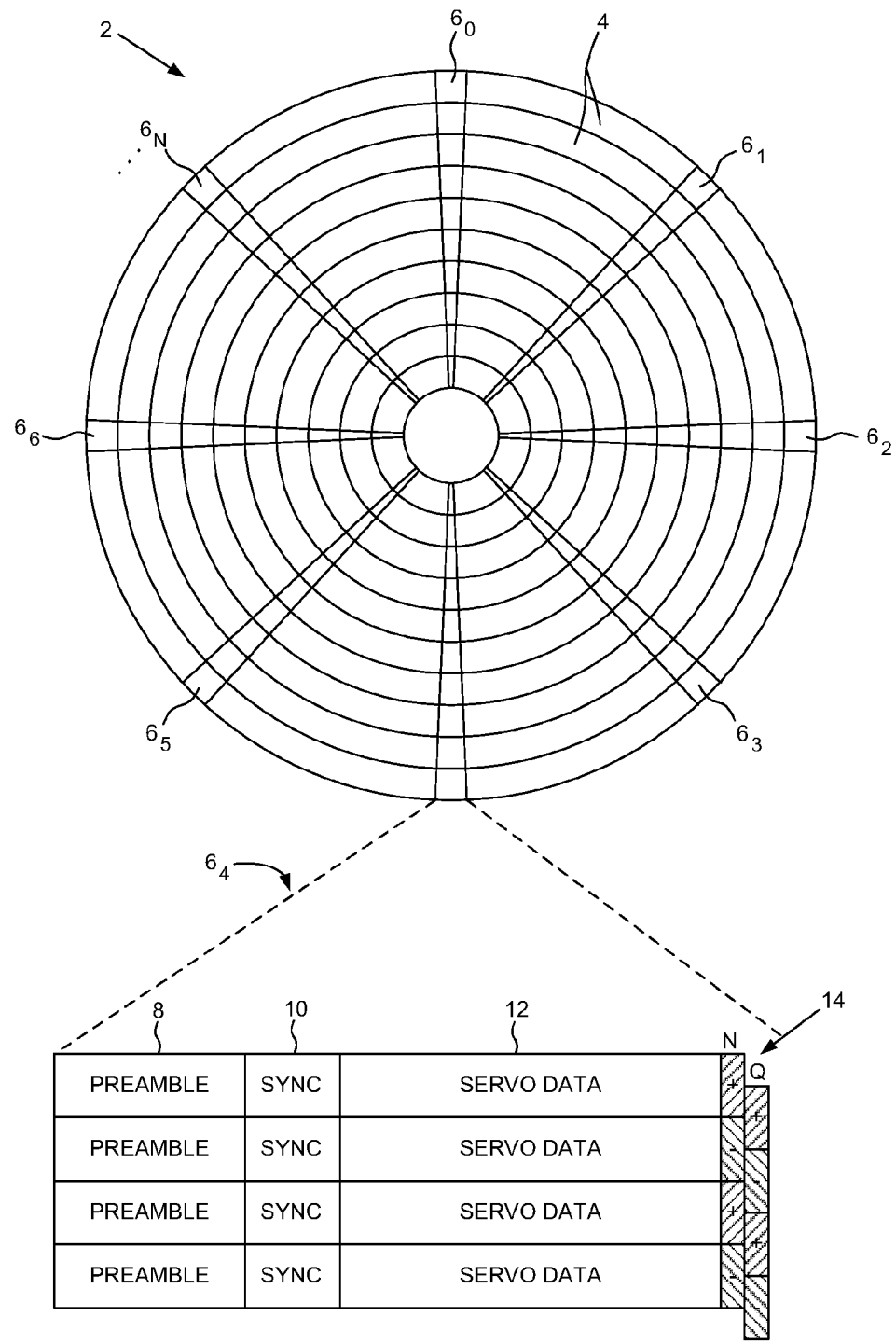
FIG. 1 shows a prior art disk format comprising servo tracks defined by servo sectors.

FIG. 2A shows a data storage device in the form of a disk drive comprising a head 16 actuated over a disk 18. The disk drive further comprises control circuitry 20 configured to execute the flow diagram of FIG. 2B, wherein data is written to the disk and read from the disk to measure a quality metric (block 22). A recording parameter is repeatedly adjusted and the quality metric is measured for each adjustment of the recording parameter (block 24). An operating value for the recording parameter is selected that corresponds to a substantially maximum areal density for the disk when the measured quality metric substantially matches a target quality metric (block 26).

In the embodiment of FIG. 2A, servo sectors $28_0$-$28_N$ define a plurality of servo tracks 30, wherein data tracks are defined relative to the servo tracks at the same or different radial density. The control circuitry 20 processes a read signal 32 emanating from the head 16 to demodulate the servo sectors $28_0$-$28_N$ and generate a position error signal (PES) representing an error between the actual position of the head and a target position relative to a target track. The control circuitry 20 filters the PES using a suitable compensation filter to generate a control signal 34 applied to a voice coil motor (VCM) 36 which rotates an actuator arm 38 about a pivot in order to actuate the head 16 radially over the disk 18 in a direction that reduces the PES. The servo sectors $28_0$-$28_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the control circuitry 20 may configure one or more recording parameters in order to achieve a target recording quality while also substantially maximizing the areal density of the disk. The areal density of the disk may be configured by adjusting a linear bit density (bits per inch (BPI)) for data recorded along a data track, and/or by adjusting a radial density of the data tracks (tracks per inch (TPI)). In one embodiment, the recording parameter adjusted by the control circuitry may be the areal density; that is, the areal density may be adjusted until it reaches a maximum when the measured quality metric substantially matches the target quality metric.

Figure 3A:
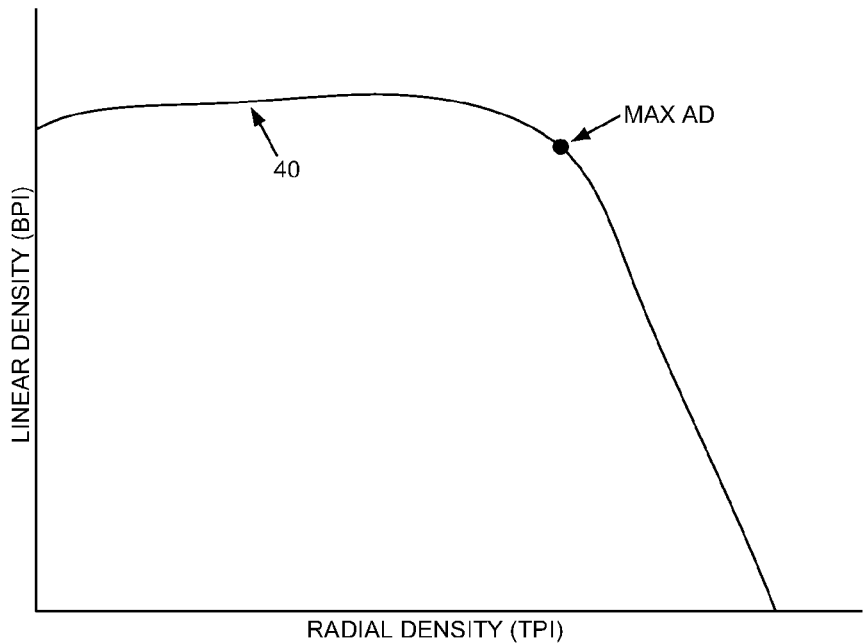
FIG. 3A shows an embodiment wherein the recording parameter comprises the areal density for the disk.

Any suitable quality metric may be measured by writing and reading data to/from the disk. Example quality metrics may include one or more of an off-track read capability (OTRC), error rate, squeeze margin, etc., wherein the measured quality metric varies relative to the areal density of the disk. For example, in one embodiment the OTRC quality metric may decrease as the linear density (BPI) increases or as the radial density (TPI) increases. FIG. 3A illustrates an embodiment where the measured quality metric matches a target quality metric (represented by curve 40) for different BPI and TPI settings. That is, there are specific BPI and TPI settings where the measured quality metric will substantially match the target quality metric along curve 40, and there is a particular BPI and TPI setting along curve 40 where the areal density will reach a maximum (i.e., where BPI×TPI will reach a maximum).

Figure 3B:
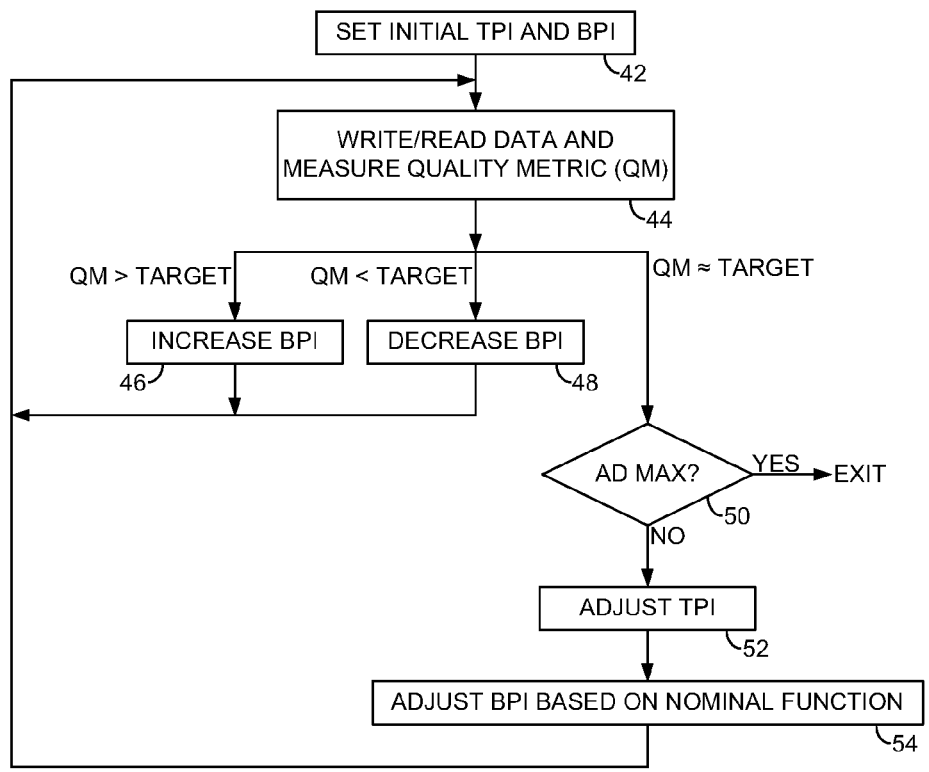
FIG. 3B is a flow diagram according to an embodiment wherein a linear bit density (bits per inch (BPI)) and a radial density (tracks per inch (TPI)) are adjusted toward a maximum areal density when the measured quality metric substantially matches the target quality metric.

FIG. 3B is a flow diagram according to an embodiment wherein the BPI and TPI settings are adjusted until the areal density reaches a maximum when the measured quality metric substantially matches a target quality metric (e.g., the maximum areal density point along curve 40 in FIG. 3A). The BPI and TPI are configured to initial settings (block 42) which may be determined in any suitable manner, such as nominal initial settings established for a family of disk drives. Data is then written and read to/from the disk in order to measure the quality metric of the recorded data at the current BPI and TPI settings (block 44). If the measured quality metric is greater than the target quality metric, then the BPI is increased (block 46), and if the measured quality metric is less than the target quality metric, then the BPI is decreased (block 48). The quality metric is again measured at block 44 for the adjusted BPI setting. The process is repeated by adjusting the BPI until the measured quality metric substantially matches the target quality metric. Once the measured quality metric substantially equals the target quality metric, a determination is made (block 50) as to whether the maximum areal density has been reached. In one embodiment, the maximum areal density may be detected when the areal density reaches a peak value (e.g., begins to decrease after increasing). If the maximum areal density has not been reached at block 50, then the TPI is adjusted (block 52) and the process is repeated by adjusting the BPI until the measured quality metric again matches the target quality metric for the new TPI. The process is repeated until the maximum areal density is detected at block 50, after which an operating value is selected for the recording parameter (BPI and TPI).

In one embodiment illustrated in FIG. 3B, after adjusting the TPI setting at block 52 the control circuitry may make a corresponding adjustment to the BPI (block 54) based on a nominal function that estimates a relationship between the BPI and TPI and the target quality metric. Referring to the example shown in FIG. 3A, the curve 40 representing the target quality metric for different BPI and TPI settings may be represented as a nominal function of BPI and TPI. For example, the curve 40 may be determined for a subset of disk drives in order to determine a nominal curve 40 and a corresponding nominal function for a family of disk drives. In one embodiment, the first BPI and TPI setting that achieves the target quality metric may be used to generate the nominal function. For example, in one embodiment the curve 40 shown in FIG. 3A may vary proportionally across the disk drives such that a single BPI and TPI point may define the function that represents curve 40 for each disk drive. In another embodiment, the control circuitry may determine two or more points along curve 40 (two or more different BPI and TPI settings that achieve the target quality metric) and then curve fit the points to generate the nominal function used at block 54 to adjust the BPI after adjusting the TPI at block 52. In one embodiment, employing a nominal function to adjust the BPI after adjusting the TPI significantly reduces the calibration time by reducing the number of BPI adjustments made at block 46 and/or bock 48 before the measured quality metric converges to the target quality metric.

Figure 4A:
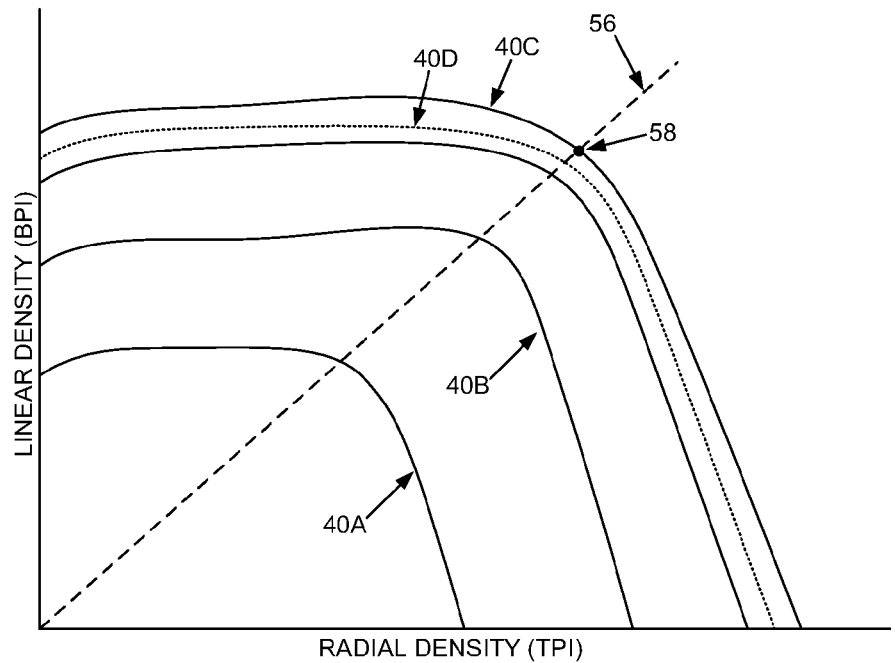
FIGS. 4A and 4B show an embodiment wherein the recording parameter may comprise a write current, laser power, overshoot, etc. which is adjusted relative to a target BPI/TPI ratio until the areal density reaches a maximum.

Any suitable recording parameter may be adjusted in order to maximize the areal density for a target quality metric. Examples of recording parameters other than BPI and TPI may include the write current applied to the write element of the head during write operations, a write power applied to a laser configured to heat the disk during write operations, an overshoot parameter, etc. FIG. 4A illustrates an embodiment wherein a number of curves 40 representing the target quality metric may correspond to a number of different settings for the recording parameter (e.g., different write current or laser write power settings). For example, curve 40A may correspond to a low write current setting and curve 40B may correspond to a higher write current setting. As the setting is increased the curves may expand outward until reaching curve 40C which may correspond to the optimal setting for the recording parameter that achieves the maximum areal density. That is, if the setting for the recording parameter is increased further, the curve will begin to contract for example to curve 40D.

Figure 4B:
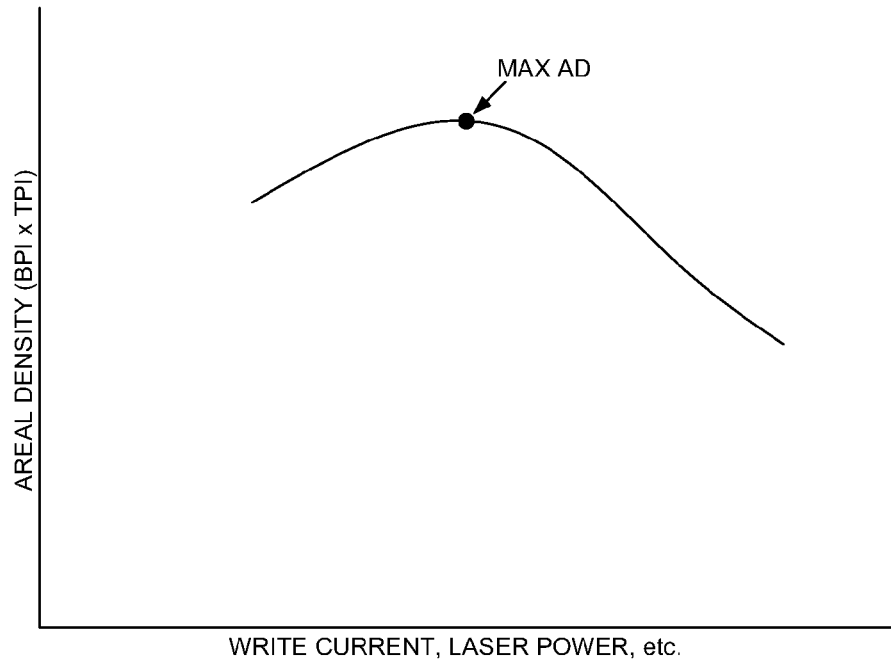

In one embodiment, a target ratio for BPI/TPI is configured by the control circuitry when calibrating the recording parameter. An example BPI/TPI ratio is represented by line 56 in FIG. 4A which, in one embodiment, may pass through the maximum areal density point of each of the target quality metric curves 40A-40D. Accordingly, for the target BPI/TPI ratio along line 56 there is a setting for the recording parameter (e.g., write current) that will maximize the areal density for the disk, such as the setting that generates point 58 along curve 40C in the example of FIG. 4A. FIG. 4B illustrates the relationship between the areal density (BPI×TPI) and the setting for the recording parameter, wherein each point in the curve of FIG. 4B corresponds to a point along line 56 of FIG. 4A.

Figure 4C:
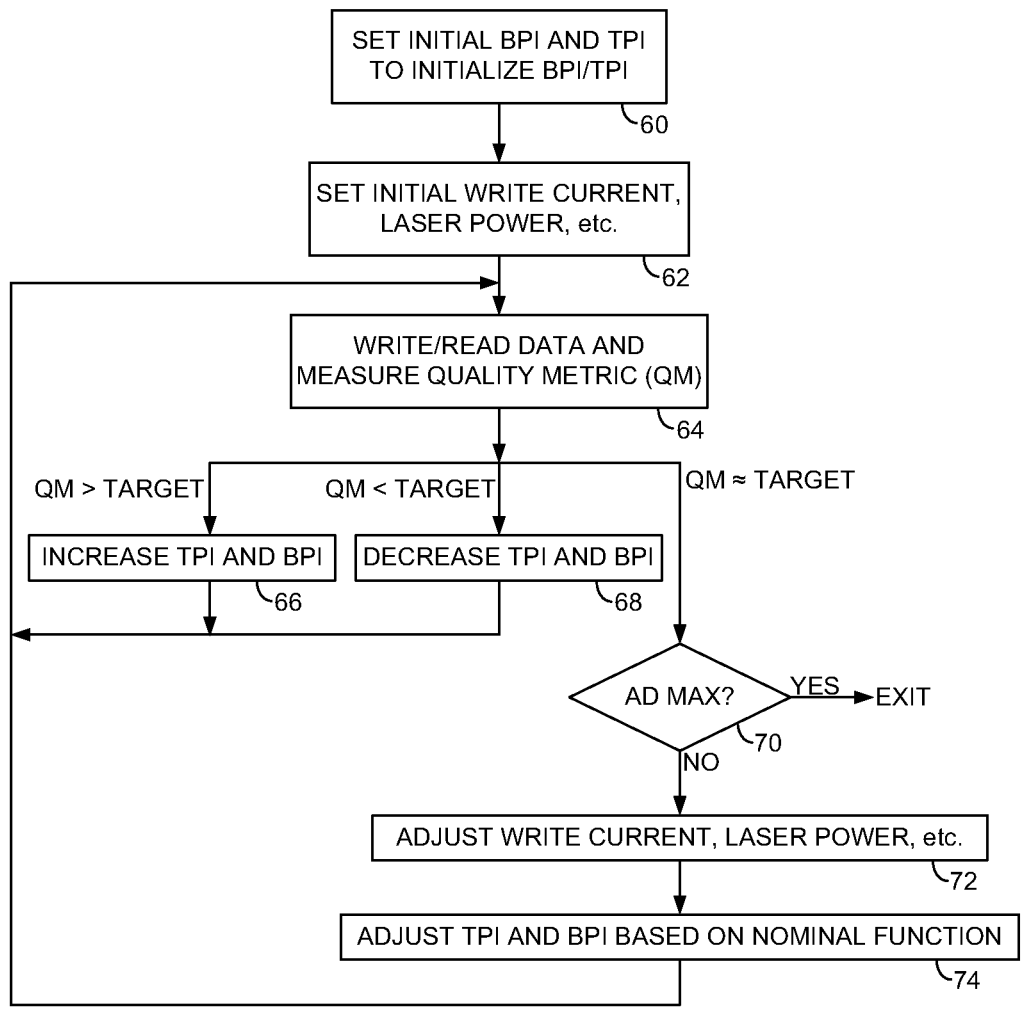
FIG. 4C is a flow diagram according to an embodiment wherein the BPI and TPI are adjusted until the measured quality metric substantially matches the target quality metric, and then the recording parameter (write current, laser power, overshoot, etc.) is adjusted and the process repeated until the areal density reaches a maximum.

FIG. 4C is a flow diagram according to an embodiment wherein the BPI and TPI are set to initial settings that also correspond to a target ratio of BPI/TPI (block 60). The recording parameter (write current, laser write power, etc.) is set to an initial setting (block 62), wherein the initial settings for BPI and TPI as well as the recording parameter may be established in any suitable manner, such as nominal initial settings established for a family of disk drives. Data is then written and read to/from the disk in order to measure the quality metric of the recorded data at the current BPI and TPI and recording parameter settings (block 64). If the measured quality metric is greater than the target quality metric, then the BPI and TPI are increased proportionally (block 66), and if the measured quality metric is less than the target quality metric, then the BPI and TPI are decreased proportionally (block 68) so as to maintain the target BPI/TPI ratio. The quality metric is again measured at block 64 for the adjusted BPI and TPI settings (i.e., for the adjusted areal density). The process is repeated by adjusting the BPI and TPI proportionally until the measured quality metric substantially matches the target quality metric. Once the measured quality metric substantially equals the target quality metric, a determination is made (block 70) as to whether the maximum areal density has been reached. If the maximum areal density has not been reached at block 70, then the recording parameter is adjusted (block 72) and the process is repeated by adjusting the BPI and TPI proportionally until the measured quality metric again matches the target quality metric for the new TPI. The process is repeated until the maximum areal density is detected at block 70, after which an operating value is selected for the recording parameter (write current, laser write power, etc.).

In one embodiment, the BPI and TPI may be adjusted at block 74 based on a nominal function that estimates a relationship between the recording parameter setting and the areal density (BPI×TPI). That is, the curve shown in FIG. 4B may be estimated using a nominal function, and when the recording parameter is adjusted at block 72, a corresponding adjustment may be made to the areal density (BPI×TPI) at block 74 based on the nominal function. In one embodiment, the nominal function may be predetermined and/or it may be determined based on one or more data points measured for the curve by executing the flow diagram of FIG. 4C one or more times for one or more recording parameter settings.

In one embodiment, the line 56 shown in FIG. 4A may not pass through the point of each target quality metric curve 40A-40D at the point where the areal density is maximum. For example, the target quality metric curves 40A-40D may not scale proportionally along the x and y axis relative to the recording parameter setting such that the line 56 may not always pass through each curve 40A-40D at the maximum areal density. Even if the target quality metric curves 40A-40D scale proportionally along the x and y axis, the line 56 representing the target BPI/TPI ratio may not pass through the maximum areal density point of each curve due to variations across disk drives. Accordingly, in one embodiment after executing the flow diagram of FIG. 4C in order to calibrate the optimal recording parameter setting (write current, laser write power, etc.) that substantially maximizes the areal density along line 56, the final point along line 56 may not correspond to the maximum areal density of the final target quality metric curve 40C. In this case, the control circuitry may execute the flow diagram of FIG. 3B after executing the flow diagram of FIG. 4C in order to make a final adjustment to BPI and TPI in order to maximize the areal density for the calibrated recording parameter setting. That is, the flow diagram of FIG. 3B may be executed using the calibrated recording parameter setting as well as the final BPI and TPI settings determined by the flow diagram of FIG. 4C. For example, the final BPI and TPI settings after executing the flow diagram of FIG. 4C may be used as the initial BPI and TPI settings at block 42 of FIG. 3B.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a head actuated over the disk; and
   control circuitry configured to:
      write data to the disk and read the data from the disk to measure a quality metric;
      repeatedly adjust a recording parameter and measure the quality metric for each adjustment of the recording parameter; and
      select an operating value for the recording parameter that corresponds to a substantially maximum areal density for the disk when the measured quality metric substantially matches a target quality metric.

2. The data storage device as recited in claim 1, wherein the recording parameter comprises the areal density for the disk.

3. The data storage device as recited in claim 1, wherein the recording parameter comprises a write current applied to a write element.

4. The data storage device as recited in claim 1, wherein the recording parameter comprises a write power applied to a laser configured to heat the disk during write operations.

5. The data storage device as recited in claim 1, wherein the control circuitry is further configured to adjust the recording parameter based on a nominal function that estimates a relationship between the recording parameter and the target quality metric.

6. The data storage device as recited in claim 5, wherein the control circuitry is further configured to generate the nominal function based on at least one recording parameter setting where the corresponding measured quality metric substantially matches the target quality metric.

7. The data storage device as recited in claim 6, wherein the control circuitry is further configured to generate the nominal function based on at least two recording parameter settings where the corresponding measured quality metric for each recording parameter substantially matches the target quality metric.

8. The data storage device as recited in claim 1, wherein the quality metric comprises an off-track read capability.

9. The data storage device as recited in claim 1, wherein the quality metric comprises an error rate.

10. The data storage device as recited in claim 1, wherein the quality metric comprises a squeeze margin.

11. A method of operating a data storage device, the method comprising:
- writing data to a disk and reading the data from the disk to measure a quality metric;
- repeatedly adjusting a recording parameter and measuring the quality metric for each adjustment of the recording parameter; and
- selecting an operating value for the recording parameter that corresponds to a substantially maximum areal density for the disk when the measured quality metric substantially matches a target quality metric.

12. The method as recited in claim 11, wherein the recording parameter comprises the areal density for the disk.

13. The method as recited in claim 11, wherein the recording parameter comprises a write current applied to a write element.

14. The method as recited in claim 11, wherein the recording parameter comprises a write power applied to a laser configured to heat the disk during write operations.

15. The method as recited in claim 11, further comprising adjusting the recording parameter based on a nominal function that estimates a relationship between the recording parameter and the target quality metric.

16. The method as recited in claim 15, further comprising generating the nominal function based on at least one recording parameter setting where the corresponding measured quality metric substantially matches the target quality metric.

17. The method as recited in claim 16, further comprising generating the nominal function based on at least two recording parameter settings where the corresponding measured quality metric for each recording parameter setting substantially matches the target quality metric.

18. The method as recited in claim 11, wherein the quality metric comprises an off-track read capability.

19. The method as recited in claim 11, wherein the quality metric comprises an error rate.

20. The method as recited in claim 11, wherein the quality metric comprises a squeeze margin.

* * * * *